United States Patent Office 2,823,211
Patented Feb. 11, 1958

---

2,823,211

SUBSTITUTED CAPROLACTONE AND METHOD FOR THE PRODUCTION THEREOF

Howard R. Guest, Charleston, and Ben W. Kiff, Ona, W. Va., assignors to Union Carbide Corporation, a corporation of New York No Drawing. Application June 28, 1954
Serial No. 439,883

6 Claims. (Cl. 260—343)

---

This invention relates to alpha, delta-dimethyl-delta, epsilon-dihydroxycaproic acid-epsilon lactone, and to the production thereof. As is will known, compounds of this type are, by virtue of the reactive lactone and hydroxy groups, valuable as plasticizers, and in the formation of polymeric materials.

The lactone may be reacted with butanol to form the butyl ester and then acetylated to form a compound useful as a plasticizer for vinyl resins, cellulose derivatives and the like. Polymeric materials may also be formed from the lactone through reaction with such compounds as amino acids, polyamines, and polybasic acids.

In general the previous syntheses of seven-membered lactones have required expensive and time-consuming operations. Our method for making this new seven-membered lactone is simple, rapid and employs readily available methacrolein dimer as the starting material.

Methacrolein, made by the catalytic oxidation of isobutylene with air, is commercially available in good supply. It readily undergoes a Diels-Alder condensation to form methacrolein dimer, 2-5-dimethyl-2-3-dihydro-2-formyl-1,4 pyran. The reaction takes place at a measurable rate with stored methacrolein at ordinary temperatures and pressures, and proceeds very swiftly and efficiently at somewhat elevated temperatures and pressures.

As is disclosed in application S. N. 272,522 of Stansbury and Guest, now U. S. Patent 2,694,077, methacrolein dimer may be hydrolized in the presence of water and a strong acid catalyst. When a carefully measured amount of acid catalyst is used, and when on conclusion of the reaction the catalyst is exactly neutralized with an equivalent amount of base, the product is a mixture of 2,5-dimethyl-2-hydroxyadipaldehyde and 2,5-dimethyl-2-formyl-tetrahydropyran-5-ol, as indicated by the following equation:

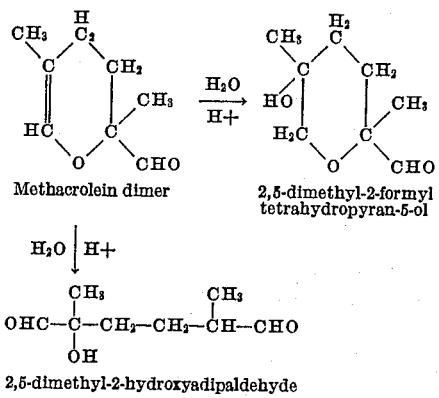

Methacrolein dimer → 2,5-dimethyl-2-formyl tetrahydropyran-5-ol 2,5-dimethyl-2-hydroxyadipaldehyde We have now discovered that if, on the termination of the hydrolysis reaction, the acid catalyst is treated with a slight deficiency of a basic material, the product obtained on distillation from the slightly acidic medium is neither of the above compounds. Instead of these, the compound obtained is alpha, delta-dimethyl-delta, epsilon-dihydroxycaproic acid lactone,

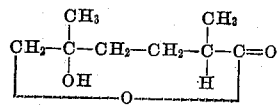

When this procedure is followed alpha, delta-dimethyl delta, epsilon-dihydroxycaproic acid lactone is obtained in a yield of 65 percent and at an efficiency of 69 percent.

The catalyst for the hydrolysis may be any strong acid such as hydrochloric, sulfuric, phosphoric, or formic. This reaction is accomplished with an excess of water at a temperature between 0° and 150° C., preferably 90° to 100° C., and an inert water-soluble solvent for the dimer may be employed in the reaction medium. The hydrolysis is fully described in the aforementioned application S. N. 272,522 of Stansbury and Guest.

At the conclusion of the hydrolysis the acid catalyst is nearly neutralized so as to give a mildly acidic medium of a pH of about 6.5.

The acidic medium may be nearly neutralized with any inorganic base. However, for ease of manipulation a weakly basic material is desirable. We prefer to use sodium bicarbonate in the neutralization step.

After the neutralization step, the weakly acidic reaction medium is subjected to distillation. In the distillation step alpha, delta-dimethyl-delta, epsilon dihydroxycarproic acid lactone is distilled and recovered.

The following examples are illustrative.

EXAMPLE I

*Preparation of 2,5-dimethyl-2-hydroxyadipaldehyde and 2,5-dimethyl-2-formyl tetrahydropyran-5-ol*

A charge of 1000 g. of dioxane, 1500 g. of $H_2O$ and exactly 200 cc. of 0.5 N $H_2SO_4$ was placed in a flask and heated to reflux temperature (95° C.). A total of 1000 g. of methacrolein dimer was then fed over a period of 4 hours. After all the dimer was in, the mixture was refluxed for an additional 3 hours. The acid catalyst was then exactly neutralized by the addition of 200 cc. of 0.5 N sodium hydroxide.

The product was distilled and 700 g. of a mixture consisting of about two-thirds 2,5-dimethyl-2-hydroxy-adipaldehyde and one-third 2,5-dimethyl-2-formyltetrahydropyran-5-ol was obtained.

EXAMPLE II

*Preparation of alpha, delta-dimethyl-alpha, epsilon-dihydroxy-caproic acid-epsilon lactone*

A charge of 500 g. of dioxane, 750 cc. of water and 1 cc. of $H_2SO_4$ was placed in a flask and heated to reflux temperature. While the mixture was refluxing 500 g. of methacrolein dimer was fed over a period of 5 hours. After all the feed was in the mixture was refluxed for an additional 3 hours. The acid catalyst was then neutralized to a pH of 6.5 with sodium bicarbonate.

Distillation of the product gave 385 g. of alpha, delta-dimethyl-delta, epsilon-dihydroxycaproic acid-epsilon lactone. This was a yield of 65% from the dimer charge. The lactone is a new compound with a melting point of 54° C., a boiling point of 112° C. at a pressure of 1 mm. of Hg, and a refractive index of 1.4710 at 30° C.

In identifying the compound as alpha, delta-dimethyl-delta, epsilon-dihydroxycaproic acid-epsilon, lactone, saponification showed the compound to have an equivalent weight of 158; chemical analysis showed the compound has a hydroxyl group. By acetylation the equivalent weight for hydroxyl groups was found to be 164 compared with the theoretical weight of 158. The observed molecular weight by the ebullioscopic method was found to be 164 compared with the theoretical weight of 158. Analysis for carbon and hydrogen gave the following results: C=60.62 percent (theoretical, 60.70 percent); H=9.07 percent (theoretical, 8.86 percent).

The compound was reacted with acetic anhydride to give the corresponding acetate. The acetate was then refined and after refining had an equivalent weight by ester analysis of 104 (theoretical, 100). The observed molecular weight of the ester was 196 (theoretical, 200).

What is claimed is:

1. As a new compound, alpha, delta-dimethyl, delta, epsilon-dihydroxycaproic acid epsilon lactone,

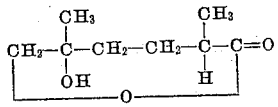

2. The method for making alpha, delta-dimethyl-delta, epsilon-dihydroxycaproic acid epsilon lactone which comprises hydrolyzing methacrolein dimer in the presence of water and strong acid, neutralizing the reaction mixture with an inorganic base to a pH of about 6.5 and distilling alpha, delta-dimethyl-delta, epsilon-dihydroxycaproic acid epsilon lactone from said mildly acidic medium.

3. The method for making alpha, delta-dimethyl-delta, epsilon-dihydroxycaproic acid epsilon lactone which comprises hydrolyzing methacrolein dimer in the presence of water, an inert water soluble solvent for methacrolein dimer, and a strong acid, neutralizing the reaction mixture with an inorganic base to a pH of about 6.5 and distilling alpha, delta-dimethyl-delta, epsilon-dihydroxycaproic acid epsilon lactone from said mildly acidic medium.

4. The method for making alpha, delta-dimethyl-delta, epsilon-dihydroxycaproic acid epsilon lactone which comprises hydrolyzing methacrolein dimer in the presence of water and a strong acid, neutralizing the reaction mixture with a weak inorganic base to a pH of about 6.5, and distilling alpha, delta-dimethyl-delta, epsilon-dihydroxycaproic acid epsilon lactone from said mildly acidic medium.

5. The method for making alpha, delta-dimethyl-delta, epsilon-dihydroxycaproic acid epsilon lactone which comprises hydrolyzing methacrolein dimer in the presence of water and strong acid, partially neutralizing the reaction mixture with sodium bicarbonate to a pH of about 6.5, and distilling alpha, delta-dimethyl-delta, epsilon-dihydroxy-caproic acid epsilon lactone from said mildly acidic medium.

6. The method for making alpha, delta-dimethyl-delta, epsilon-dihydroxycaproic acid epsilon lactone which comprises hydrolyzing methacrolein dimer in the presence of water, an inert water soluble solvent for methacrolein dimer, and a strong acid, partially neutralizing the reaction mixture with sodium bicarbonate to a pH of about 6.5, and distilling alpha, delta-dimethyl-delta, epsilon-dihydroxycaproic acid epsilon lactone from said mildly acidic medium.

References Cited in the file of this patent

UNITED STATES PATENTS

| | | |
|---|---|---|
| 2,479,283 | Whetstone | Aug. 16, 1949 |
| 2,513,133 | Hatch et al. | June 27, 1950 |
| 2,528,592 | Hall et al. | Nov. 7, 1950 |
| 2,694,077 | Stansbury et al. | Nov. 9, 1954 |

OTHER REFERENCES

Schulz et al.: Angew. Chem., 62, pp. 109–111, 117 (1950).